(12) United States Patent
Smith (10) Patent No.: US 12,132,852 B2
(45) Date of Patent: Oct. 29, 2024

(54) APPARATUS FOR GRASPING AND PROPPING ELECTRONIC DEVICES

(71) Applicant: Paul Lawrence Smith, Sanborn, NY (US)

(72) Inventor: Paul Lawrence Smith, Sanborn, NY (US)

( * ) Notice: Subject to any disclaimer, the term of this patent is extended or adjusted under 35 U.S.C. 154(b) by 674 days.

(21) Appl. No.: 17/240,909

(22) Filed: Apr. 26, 2021

(65) Prior Publication Data

US 2021/0337056 A1    Oct. 28, 2021

Related U.S. Application Data (60) Provisional application No. 63/014,976, filed on Apr. 24, 2020.

(51) Int. Cl.
| | |
|---|---|
| *H04M 1/04* | (2006.01) |
| *F16M 13/04* | (2006.01) |
| *F16M 13/06* | (2006.01) |
| *G06F 1/16* | (2006.01) |

(52) U.S. Cl.
CPC ............ *H04M 1/04* (2013.01); *F16M 13/04* (2013.01); *F16M 13/06* (2013.01); *G06F 1/166* (2013.01)

(58) Field of Classification Search
CPC .. H04M 1/04; H04M 1/724095; F16M 13/04; F16M 11/06; F16M 2200/08; G06F 1/166
See application file for complete search history.

(56) References Cited

U.S. PATENT DOCUMENTS

| | | | |
|---|---|---|---|
| D703,673 S | 4/2014 | Kittlaus | |
| 9,565,909 B2 | 2/2017 | Song et al. | |
| 10,201,221 B1 | 2/2019 | Chang et al. | |
| 11,456,769 B1 * | 9/2022 | Miller | G06F 1/1656 |
| 2011/0279959 A1 | 11/2011 | Lopez | |
| 2012/0113572 A1 | 5/2012 | Gaddis, II et al. | |

(Continued)

FOREIGN PATENT DOCUMENTS

| | | | | |
|---|---|---|---|---|
| CN | 105468207 A | * | 4/2016 | |
| JP | 2009205531 A | * | 9/2009 | ............ A45F 3/14 |
| KR | 20100071596 A | * | 6/2010 | ............ A45F 5/004 |

OTHER PUBLICATIONS

WO 2018109437A1, Hill et al., Electronic Device Stand, Jun. 2018, pp. 1-8 (Year: 2018).*

(Continued)

*Primary Examiner* — Keith Ferguson (57) ABSTRACT

An apparatus for grasping and propping electronic devices is an apparatus that enables users to easily handle a portable electronic device with one hand or to prop the device on a surface for comfortable viewing of the device's screen. The apparatus can be utilized with tablet computing devices but can also be utilized with other electronic devices. The apparatus includes an oblong base, a propping leg, a hand strap, and an attachment mechanism. The oblong base receives the body of the electronic device when the apparatus is attached to the backside of the electronic device or to a device accessory. The propping leg enables the apparatus to be utilized as a stand for the electronic device. The hand strap enables the apparatus to be utilized as a hand holder for the electronic device. The attachment mechanism enables the apparatus to be easily and releasably attached to the electronic device.

17 Claims, 8 Drawing Sheets

(56) References Cited

U.S. PATENT DOCUMENTS

| | | |
|---|---|---|
| 2013/0293072 A1 | 11/2013 | Sturniolo |
| 2013/0295549 A1 | 11/2013 | Hills |
| 2017/0318959 A1 | 11/2017 | Castleberry |
| 2021/0127819 A1* | 5/2021 | Carnevali ................. A45F 5/10 |

OTHER PUBLICATIONS

Sanmeo, AICOO Hybrid Armor Shockproof Tablet Case with Holder Shoulder Belt Hand Strap Pen Slot for Surface Go Surface Pro 4 5 6 OPP, dhgate.com.
Padlock, Hand Grip and Dock Tablet Stand, ipadlock.com.
Aharn, Tablet Kickstand Attempts, thingiverse.com.
Ram Mounts, Tablet Mounts, rammount.com.
Octa, Octa Wall Mount, amazon.com.
Moffatt, Capsa SlimCart, moffattproducts.com.
GCX, Roll Stand for Tablet, gcx.com.
Ergotron, Mounts, ergotron.com.

* cited by examiner

APPARATUS FOR GRASPING AND PROPPING ELECTRONIC DEVICES

The current application claims a priority to the U.S. provisional patent application Ser. No. 63/014,976 filed on Apr. 24, 2020. The current application is filed on Apr. 26, 2021 while Apr. 24, 2021 was on a weekend.

FIELD OF THE INVENTION

The present invention relates generally to accessories for portable electronic devices. More specifically, the present invention is an accessory that can be used as a hand holder or a propping device for the portable electronic device.

BACKGROUND OF THE INVENTION

Tablet computing devices, commonly referred to just as "tablets," have made great strides in the marketplace of portable computers and have become a popular choice for consumers looking for easily transportable and usable computers. Tablets allow users to perform common activities such as browsing the web, listening to music, video streaming, or reading emails on the go. However, there are several drawbacks associated with the tablets currently available in the market. For example, it is difficult for users to securely hold the tablet with one hand and enter data with the other hand due to the large size of most tablets. In addition, most tablets are manufactured with sleek exterior surfaces that make securely grabbing the tablets even more difficult. Moreover, streaming videos on a tablet can be a cumbersome task as the tablet must be kept at a proper orientation to properly enjoy the stream. Now, there are many tablet accessories available to help users operate tablets efficiently and comfortably. For example, there are tablet hand holders that enable users to handle a tablet with a single hand. There are also tablet mounts or stands that let users position their tablets on a surface at an angle to comfortable watch the screen of the tablet. However, there are few accessories with both capabilities integrated into a single device.

An objective of the present invention is to provide a portable electronic device accessory that can be used as a stand to prop up the portable electronic device on a surface or as a hand holder to handle the portable electronic device with a single hand. Another objective of the present invention is to provide a portable electronic device accessory that can be easily attached directly to the portable electronic device or to another accessory, such as a protective case of the portable electronic device. Further, another objective of the present invention is to provide a portable electronic device accessory that can be reoriented while being attached to the portable electronic device to accommodate portrait and landscape orientations. Additional features and benefits of the present invention are further discussed in the sections below.

SUMMARY OF THE INVENTION

The present invention is an apparatus for grasping and propping electronic devices such as tablets or smartphones. The present invention is simple in structure, inexpensive to manufacture, and easy to use. The present invention includes a hand strap that enables users to easily hold the electronic device with one hand, thus maximizing the utility of the electronic device by freeing the other hand to perform other actions. The present invention also includes a propping leg that enables the apparatus to be used as a stand to prop up the electronic device on a surface so that users can comfortably watch the screen of the portable electronic device without having to handle the portable electronic device. Further, the present invention provides an attachment mechanism that facilitates the easy attachment of the apparatus to the portable electronic device or to another accessory, such as the device's protective case. Further, the attachment mechanism enables the reorientation of the apparatus to accommodate portrait and landscape orientations of the portable electronic device.

BRIEF DESCRIPTION OF THE DRAWINGS

It should be noted that the drawings are schematic and not necessarily drawn to scale. Some drawings are enlarged or reduced to improve drawing legibility.

DETAIL DESCRIPTIONS OF THE INVENTION

All illustrations of the drawings are for the purpose of describing selected versions of the present invention and are not intended to limit the scope of the present invention.

The foregoing and other objects and advantages will appear from the description to follow. It is to be understood, however, that the present invention may be embodied in various forms. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense.

Figure 1:
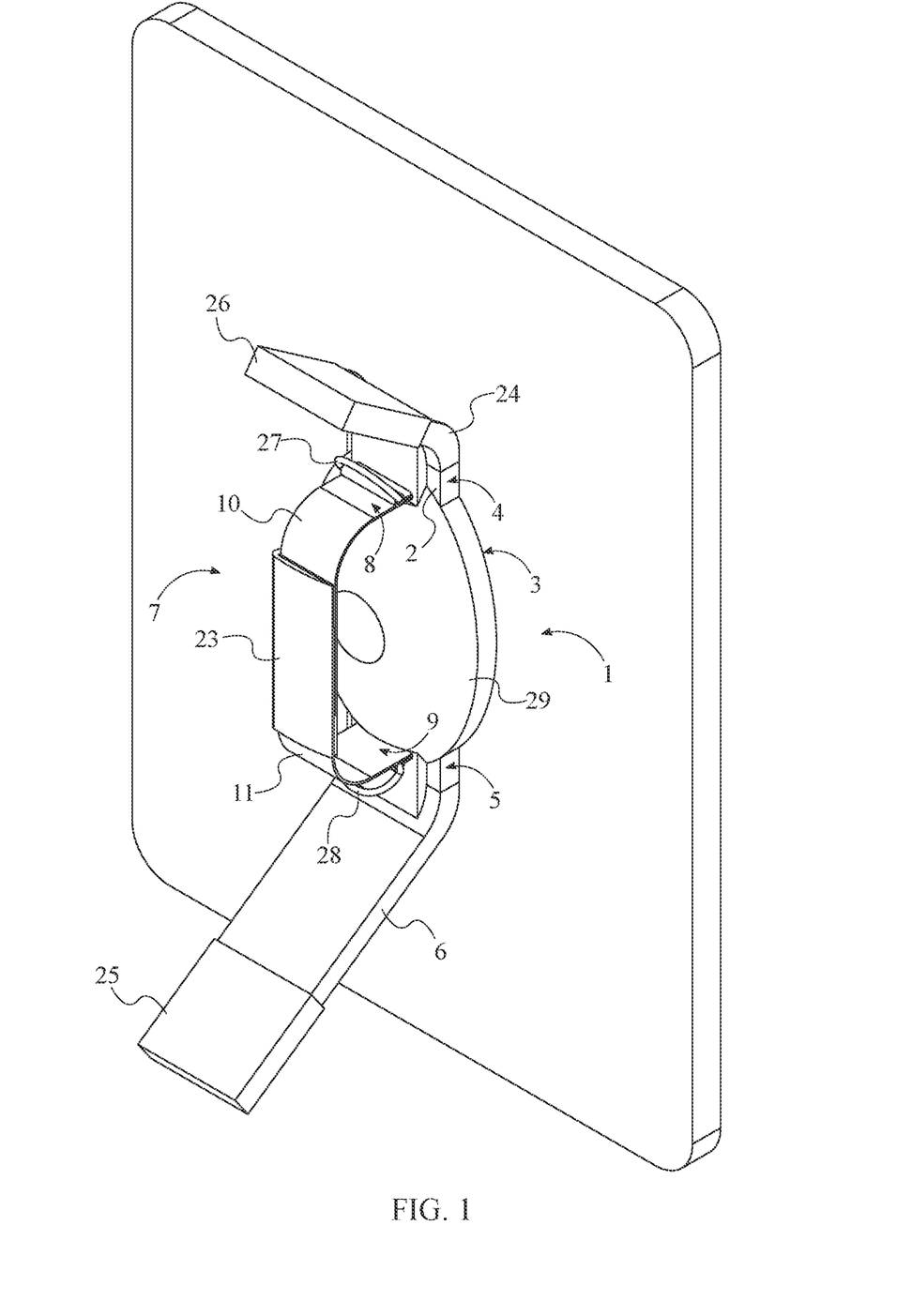
FIG. 1 is a top rear perspective view showing the present invention used as a hand holder for an electronic device, wherein the electronic device is shown in portrait orientation.
Figure 2:
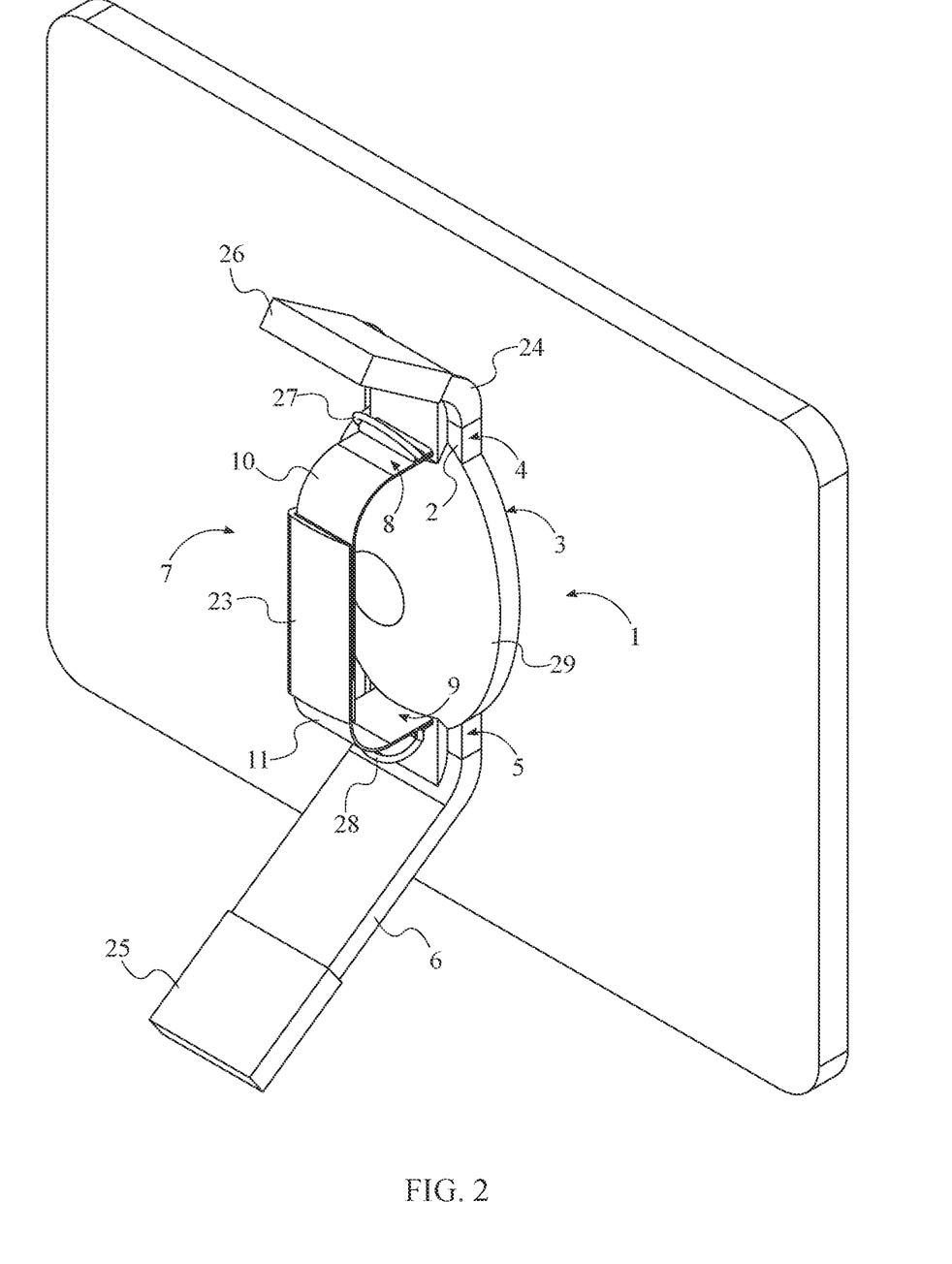
FIG. 2 is a top rear perspective view showing the present invention used as a hand holder for an electronic device, wherein the electronic device is shown in landscape orientation.
Figure 6:
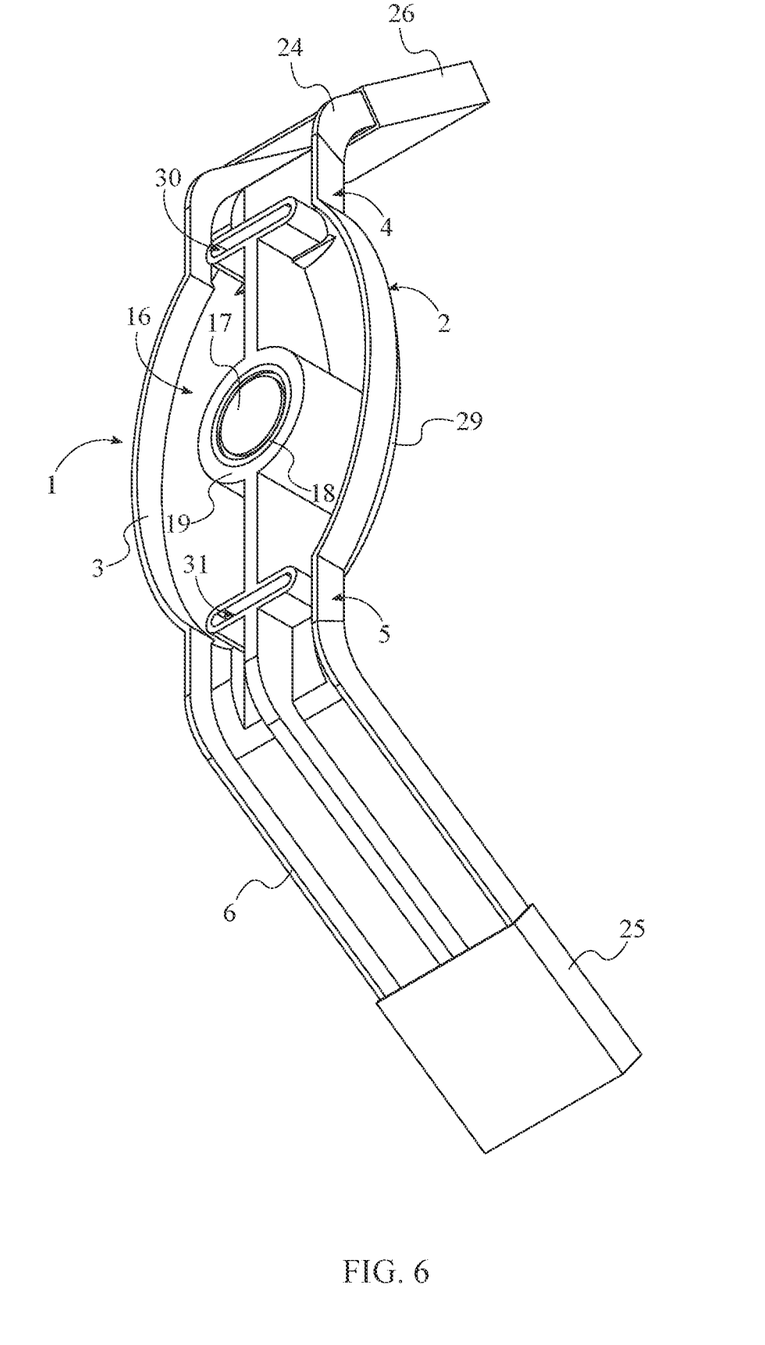
FIG. 6 is a bottom front perspective view showing the present invention without the hand strap.

The present invention is an apparatus for grasping and propping electronic devices that enables users to easily handle a portable electronic device with one hand or to prop the device on a surface for comfortable viewing of the device's screen. The present invention is designed to be used with tablet computing devices but can also be utilized with other electronic devices. As can be seen in FIGS. 1 and 6, the present invention may comprise an oblong base 1, a propping leg 6, a hand strap 7, and an attachment mechanism 16. The oblong base 1 receives the body of the electronic device when the present invention is attached to the electronic device. The propping leg 6 enables the present invention to be used as a stand for the electronic device. The hand strap 7 enables the present invention to be utilized as a hand holder for the electronic device. The attachment mechanism 16 enables the present invention to be easily and releasably attached to the electronic device.

Figure 3:
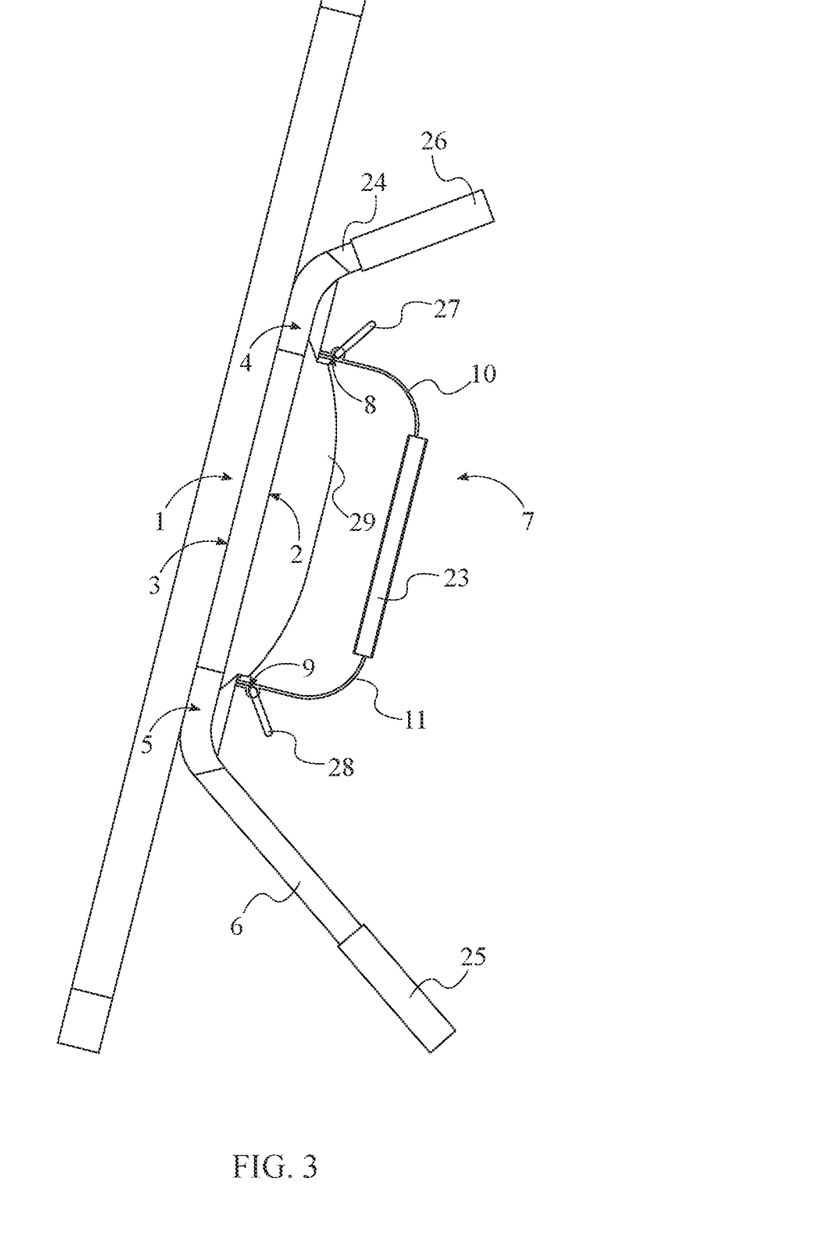
FIG. 3 is a side view showing the present invention used as a stand, wherein the propping leg is used to support a large electronic device.
Figure 4:
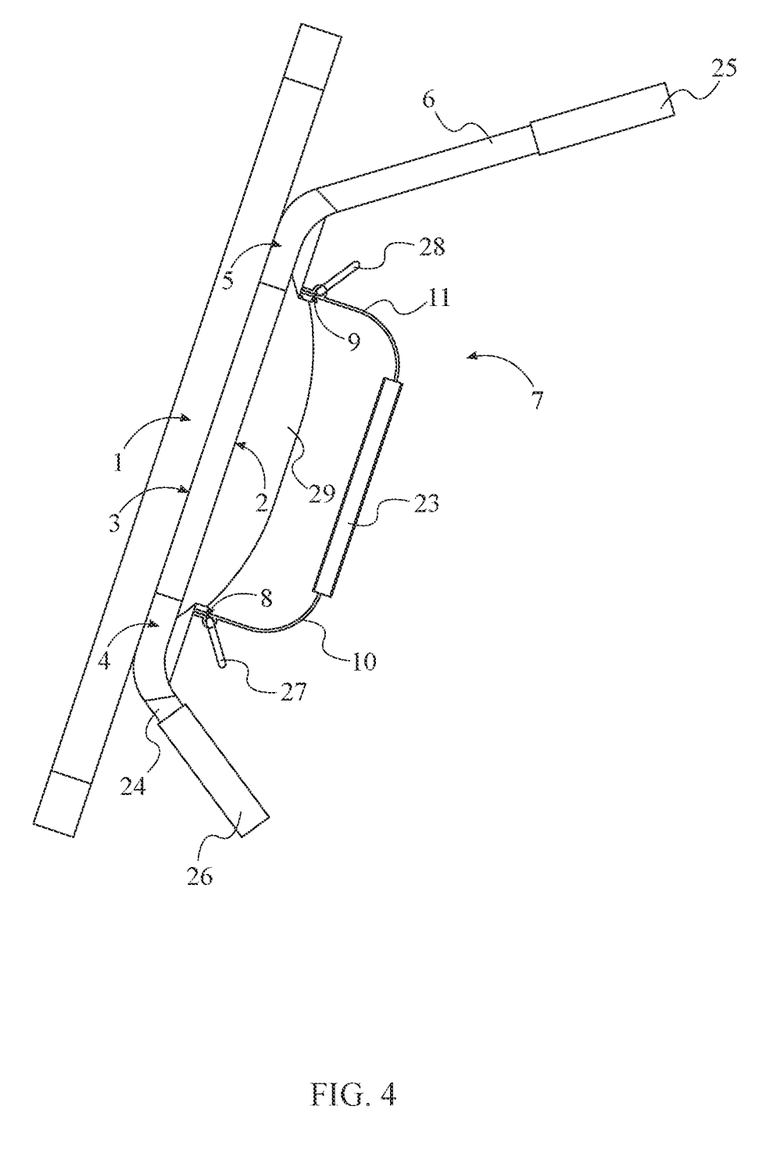
FIG. 4 is a side view showing the present invention used as a stand, wherein the resting stub is used to support a smaller electronic device.
Figure 5:
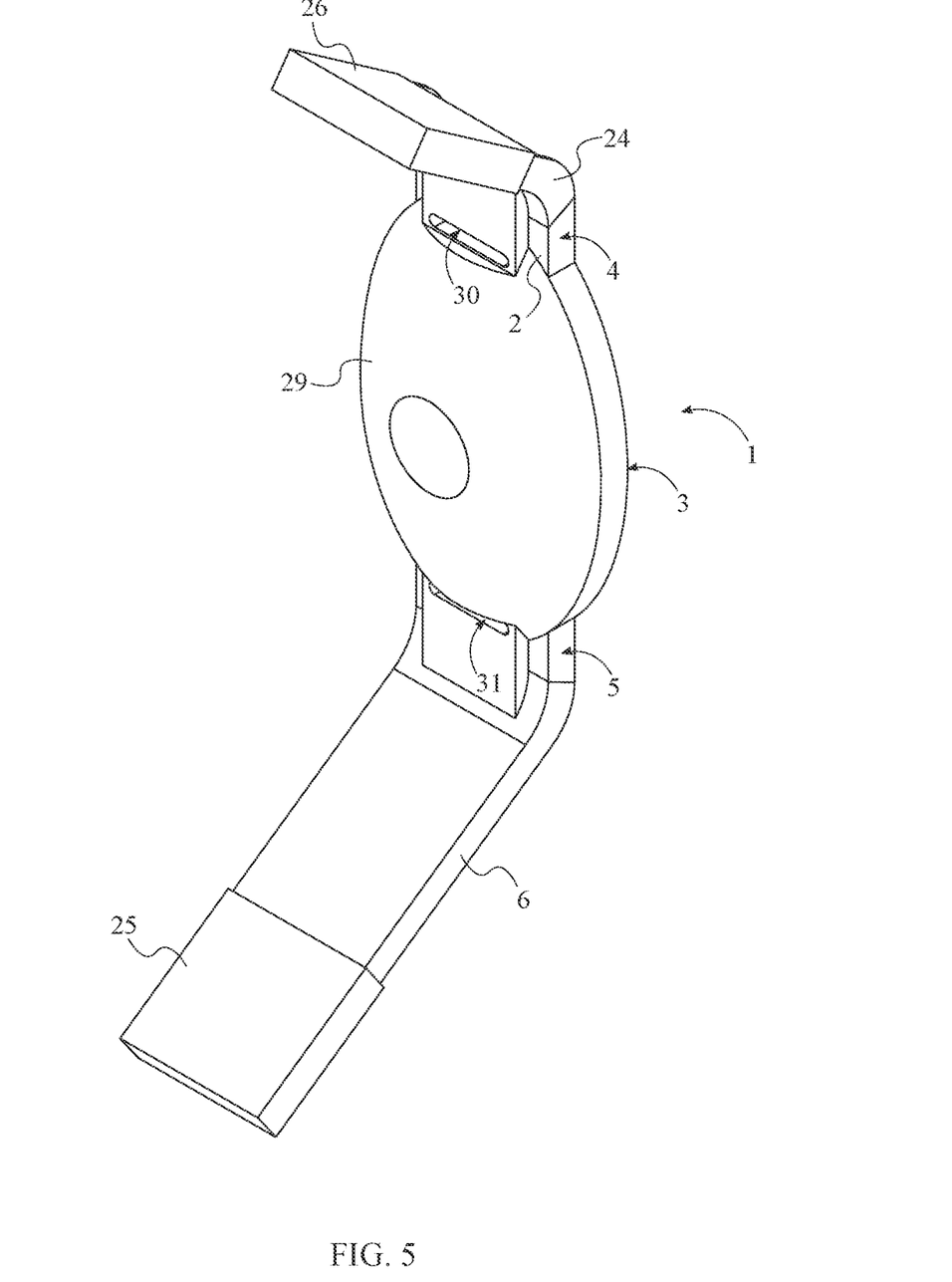
FIG. 5 is a top rear perspective view showing the present invention without the hand strap.
Figure 7:
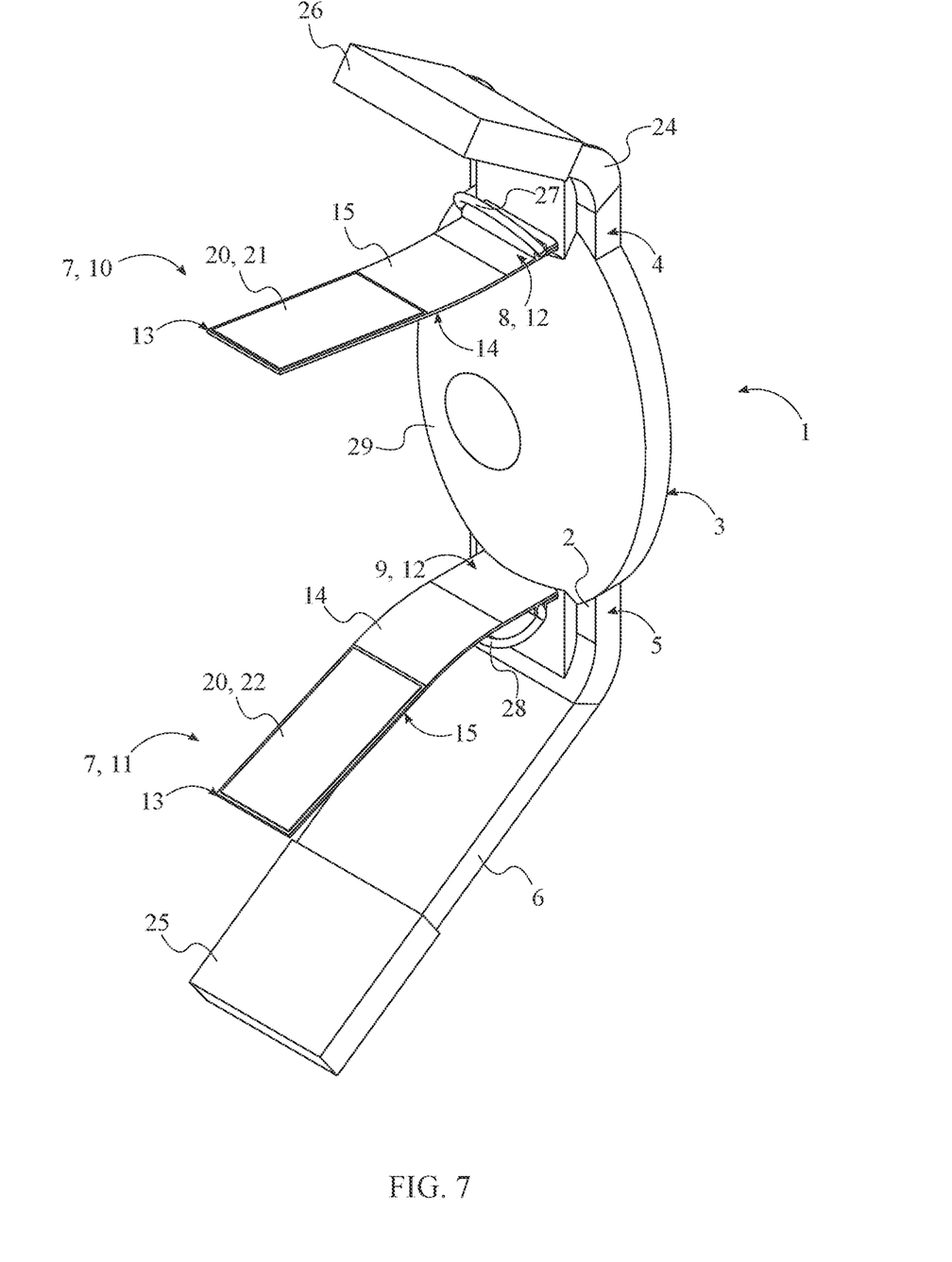
FIG. 7 is a top rear perspective view showing the present invention, wherein the hand strap is shown unfastened.

The general configuration of the aforementioned components enables users to comfortably operate an electronic device without having to handle the electronic device with both hands. As can be seen in FIG. 1 through 4, the oblong base 1 is designed to be attached to the backside of the electronic device or a device accessory such as a protective case. The oblong base 1 is large enough to fit on the backside of the electronic device but can also be sized to fit electronic devices of different sizes. In addition, the oblong base 1 may be made of plastic material, preferably thermoplastic material, but may be made from other suitable materials. The oblong base 1 comprises a first lateral side 2, a second lateral side 3, a first base end 4, and a second base end 5 corresponding to the oblong shape and the relative thinness of the oblong base 1. The hand strap 7 is a relative long, thin strap structure designed to fasten the user's hand to the oblong base 1. The hand strap 7 comprises a first strap end 8 and a second strap end 9 corresponding to the terminal ends of the hand strap 7. The first lateral side 2 is positioned opposite to the second lateral side 3 about the oblong base 1 due to the overall thin structure of the oblong base 1. Further, the first strap end 8 is hingedly connected to the oblong base 1, adjacent to the first base end 4, to movably secure the hand strap 7 to the oblong base 1 at one end. Likewise, the second strap end 9 is hingedly connected to the oblong base 1, adjacent to the second base end 5, to movably secure the hand strap 7 to the oblong base 1 at the other end. Thus, the rest of the hand strap 7 is left free, enabling the hand strap 7 to be fastened about the user's hand. In some embodiments, the oblong base 1 may further comprise a first orifice 30 and a second orifice 31, each traversing through the oblong base 1. As can be seen in FIG. 5 through 7, the first orifice 30 and the second orifice 31 enable the first strap end 8 and the second strap end 9 to be hingedly connected to the second lateral side 3 instead of the first lateral side 2 to better secure the hand strap 7 to the oblong base 1. The first orifice 30 is positioned adjacent to the first base end 4, while the second orifice 31 is positioned adjacent to the second base end 5. Then, the first strap end 8 is inserted through the first orifice 30 and hingedly connected to the oblong base 1 on the second lateral side 3. Likewise, the second strap end 9 is inserted through the second orifice 31 and hingedly connected to the oblong base 1 on the second lateral side 3. Thus, the hand strap 7 is more securely connected to the oblong base 1.

Moreover, the second base end 5 is terminally connected to the propping leg 6 to secure the oblong base 1 to the propping leg 6, as can be seen in FIG. 1 through 6. In addition, the propping leg 6 is oriented at an obtuse angle with the first lateral side 2 to maintain the oblong base 1 at an angle from the propping leg 6. Consequently, when the present invention is used as a stand for an electronic device, the propping leg 6 keeps the electronic device at a comfortable angle for the user to watch the screen of the electronic device. In other embodiments, the second base end 5 may be hingedly connected to the propping leg 6 so that the user may adjust the angle between the first lateral side 2 and the propping leg 6. Furthermore, the attachment mechanism 16 is positioned in between the first base end 4 and the second base end 5 to center the attachment mechanism 16 on the oblong base 1. The attachment mechanism 16 is also mounted onto the second lateral side 3 to attach the oblong base 1 to the backside of the desired electronic device or device accessory. In other embodiments, the present invention may further include optional cooling or heating packs integrated into the oblong base 1 so that the packs are positioned against the backside of the electronic device. Thus, the average temperature of the electronic device is kept within the manufacturer specified parameters.

To prevent the propping leg 6 from sliding along the surface when the present invention is used as a stand, the present invention may further comprise a leg stopper grip 25. As can be seen in FIG. 1 through 4, the leg stopper grip 25 increases the friction between the propping leg 6 and the surface to maintain the electronic device securely propped up even in smooth surfaces. The leg stopper grip 25 is terminally connected to the propping leg 6, opposite to the second base end 5, so that the leg stopper grip 25 is positioned where the propping leg 6 is in contact with the surface. In other embodiments, the leg stopper grip 25 may be replaced with different gripping devices.

Figure 8:
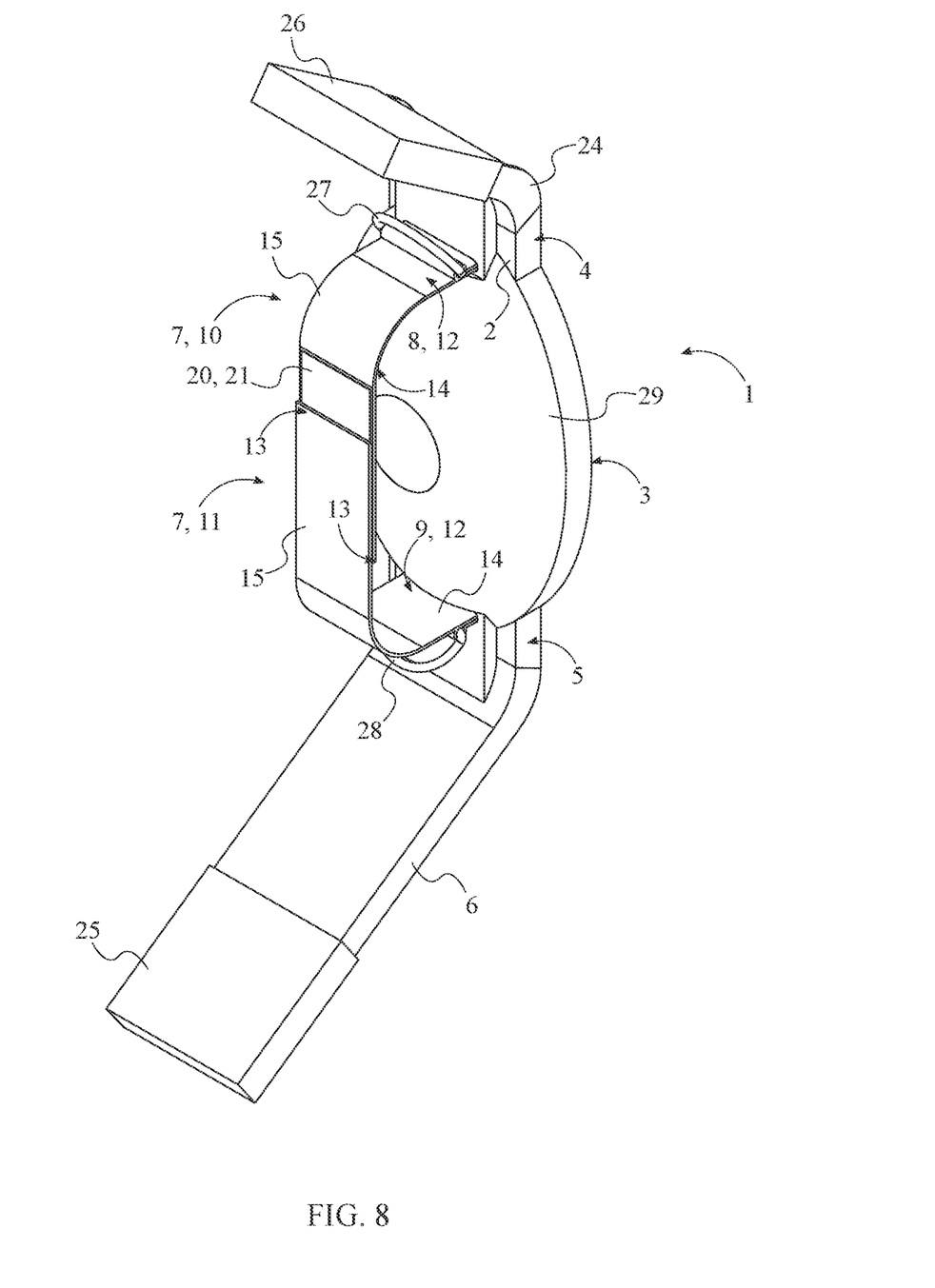
FIG. 8 is a top rear perspective view showing the present invention, wherein the hand strap is shown fastened.

As can be seen in FIGS. 7 and 8, to facilitate the fastening and unfastening of the hand strap 7, the hand strap 7 may further comprise a first strap member 10 and a second strap member 11 that can be selectively fastened to each other. The first strap member 10 and the second strap member 11 also enable the length adjustment of the hand strap 7 to accommodate different hand sizes. The first strap member 10 and the second strap member 11 each comprise a first member end 12 and a second member end 13 corresponding to the terminal ends of the individual elongated members. The first member end 12 of the first strap member 10 is hingedly connected to the oblong base 1, adjacent to the first base end 4, to movably secure the first strap member 10 to the oblong base 1. Similarly, the first member end 12 of the second strap member 11 is hingedly connected to the oblong base 1, adjacent to the second base end 5, to movably secure the second strap member 11 to the oblong base 1. Moreover, the second member end 13 of the first strap member 10 is positioned offset from the oblong base 1. Likewise, the second member end 13 of the second strap member 11 is positioned offset from the oblong base 1. Thus, the first strap member 10 and the second strap member 11 leave enough space between the hand strap 7 and the oblong base 1 to receive the user's hand.

In addition, the present invention may further comprise a length-adjusting fastener 20 to lock a specific working length of the hand strap 7 corresponding to the size of the user's hand. As can be seen in FIGS. 7 and 8, the first strap member 10 and the second strap member 11 may each further comprise an inner band surface 14 and an outer band surface 15 corresponding to the lateral surfaces of the elongated thin strap members. The length-adjusting fastener 20 comprises a first fastener portion 21 and a second fastener portion 22 corresponding to the separate interlocking portions of the length-adjusting fastener 20. The length-adjusting fastener 20 can be, but is not limited to, a hook-and-loop fastener, wherein the first fastener portion 21 is a loops portion of the hook-and-loop fastener, and wherein the second fastener portion 22 is a hooks portion of the hook-and-loop fastener. The first fastener portion 21 is mounted onto the outer band surface 15 of the first strap member 10, adjacent to the second member end 13 of the first strap member 10. In addition, the second fastener portion 22 is mounted onto the inner band surface 14 of the second strap member 11, adjacent to the second member end 13 of the second strap member 11. Thus, the first fastener portion 21 can be engaged along the second fastener portion 22 by moving the second member end 13 of the first strap member 10 against the second member end 13 of the second strap member 11. In other embodiments, the length-adjusting fastener 20 can be replaced with other fastening mechanisms.

To provide additional comfort to the user while handling the electronic device using the hand strap 7, the present invention may further comprise a padded sleeve 23. As can be seen in FIG. 1 through 4, the padded sleeve 23 protects the user's hand from friction burns that may be caused by the hand strap 7 when the hand strap 7 is fastened around the user's hand. The hand strap 7 is positioned through the padded sleeve 23 so that the padding of the padded sleeve 23 is positioned in between the hand strap 7 and the user's hand. Thus, the user's hand is protected from injuries caused by movement of the hand strap 7 against the user's hand. In other embodiments, the padded sleeve 23 may be replaced with padding integrated into the hand strap 7 or other padding components integrated into the present invention.

The attachment mechanism 16 is configured to releasably attach the oblong base 1 to the backside of the electronic device or the protective case. In addition, the attachment mechanism 16 enables the rotation of the present invention to accommodate portrait or landscape orientations of the electronic device. As can be seen in FIG. 6, the attachment mechanism 16 may further comprise a magnet 17, a free setting 18, and a fixed setting 19. The magnet 17 facilitates the easy attachment of the oblong base 1 to the electronic device or a device accessory without permanently connecting the oblong base 1 to the electronic device or the device accessory. The free setting 18 and the fixed setting 19 enable the rotation of the oblong base 1 about the magnet 17. The magnet 17 is connected into the free setting 18 so that the magnet 17 does not fall off the free setting 18 or gets separated from the oblong base 1. The free setting 18 is rotatably connected to the fixed setting 19 so that oblong base 1 can rotate about the magnet 17. Finally, the fixed setting 19 is connected onto the second lateral side 3, securing the free setting 18 and the magnet 17 to the oblong base 1 without obstructing the user's hand when the present invention is used as a hand holder. In other embodiments, the attachment mechanism 16 may utilize different attachment means, such as a suction mechanism or an adhesive.

To provide a better grip to the user when handling the electronic device, the present invention may further comprise a resting stub 24. As can be seen in FIG. 1 through 4, the resting stub 24 can be used to receive the user's thumb to handle the electronic device more securely. The resting stub 24 can also be used to prop a smaller electronic device, such as a smartphone, when the present invention is used as a stand. The first base end 4 is terminally connected to the resting stub 24 to secure the resting stub 24 to the oblong base 1. Further, the resting stub 24 is oriented at an obtuse angle with the first lateral side 2, similar to the propping leg 6. Thus, the user's thumb can be ergonomically placed on the resting stub 24 when the present invention is used as a hand holder. Alternatively, the smaller electronic device will be kept at a comfortable angle when resting against the present invention on a surface when the present invention is used as a stand with the resting stub 24.

Furthermore, similar to the propping leg 6, the resting stub 24 may also include gripping aids to prevent slipping of the user's thumb or when the resting stub 24 is used to prop up the electronic device. As can be seen in FIG. 1 through 4, the present invention may further comprise a stub stopper grip 26 similar to the leg stopper grip 25. The stub stopper grip 26 increases the friction between the resting stub 24 and the user's thumb or surface to prevent slippage. The stub stopper grip 26 is terminally connected to the resting stub 24, opposite to the first base end 4, so that the stub stopper grip 26 is positioned where the resting stub 24 is contact with the user's thumb or surface. In other embodiments, the stub stopper grip 26 may be replaced with different gripping means.

Further, to enable the present invention to be carried using a lanyard or similar device, or to hang other objects from the present invention, the present invention may further comprise a first ring 27 and a second ring 28. As can be seen in FIG. 1 through 4, the first ring 27 and the second ring 28 enable the user to utilize an external strap or lanyard to hang the present invention from the neck or to hang any object from the present invention. The first ring 27 is hingedly tethered to the hand strap 7, adjacent to the first base end 4. Similarly, the second ring 28 is hingedly tethered to the hand strap 7, adjacent to the second base end 5. Thus, when an external strap is connected in between the first ring 27 and the second ring 28, the present invention is balanced on the external strap so that the present invention does not hang unevenly from the external strap. In other embodiments, the first ring 27 and the second ring 28 may be replaced with other connectors.

Finally, to increase the comfort on the user's hand, the present invention may further comprise a palm-bracing protrusion 29. As can be seen in FIGS. 3 and 4, the palm-bracing protrusion 29 is preferably a convex protrusion that allows the present invention to be more ergonomic as the palm-bracing protrusion 29 naturally conforms to the contour of the user's hands. The palm-bracing protrusion 29 is positioned across the first lateral side 2 so that the palm-bracing protrusion 29 is positioned where the user's hand is placed. When the user utilizes the present invention as a hand holder, the user's hand is positioned through the gap formed between the first lateral side 2 and the hand strap 7, with the user's palm being in contact with the palm-bracing protrusion 29. The palm-bracing protrusion 29 is also attached onto the first lateral side 2 so that the user's hand rests on the palm-bracing protrusion 29 and does not move as the user handles the electronic device. In other embodiments, the palm-bracing protrusion 29 may be replaced with other ergonomic features.

Although the invention has been explained in relation to its preferred embodiment, it is to be understood that many other possible modifications and variations can be made without departing from the spirit and scope of the invention.

What is claimed is:

1. An apparatus for grasping and propping electronic devices comprising:
   an oblong base;
   a propping leg;
   a hand strap;
   an attachment mechanism;
   the oblong base comprising a first lateral side, a second lateral side, a first base end, and a second base end;
   the hand strap comprising a first strap end, a second strap end, a first strap member, and a second strap member;
   the first strap member and the second strap member each comprising a first member end and a second member end;
   the first lateral side being positioned opposite to the second lateral side about the oblong base;
   the first strap end being hingedly connected to the oblong base, adjacent to the first base end;
   the second strap end being hingedly connected to the oblong base, adjacent to the second base end;
   the second base end being terminally connected to the propping leg;

the propping leg being oriented at an obtuse angle with the first lateral side;

the attachment mechanism being positioned in between the first base end and the second base end;

the attachment mechanism being mounted onto the second lateral side;

the first member end of the first strap member being hingedly connected to the oblong base, adjacent to the first base end;

the first member end of the second strap member being hingedly connected to the oblong base, adjacent to the second base end;

the second member end of the first strap member being positioned offset from the oblong base; and, the second member end of the second strap member being positioned offset from the oblong base.

2. The apparatus for grasping and propping electronic devices as claimed in claim 1 comprising:

a leg stopper grip; and, the leg stopper grip being terminally connected to the propping leg, opposite to the second base end.

3. The apparatus for grasping and propping electronic devices as claimed in claim 1 comprising:

a length-adjusting fastener;

the first strap member and the second strap member each further comprising an inner band surface and an outer band surface;

the length-adjusting fastener comprising a first fastener portion and a second fastener portion;

the first fastener portion being mounted onto the outer band surface of the first strap member, adjacent to the second member end of the first strap member;

the second fastener portion being mounted onto the inner band surface of the second strap member, adjacent to the second member end of the second strap member; and, the first fastener portion being engaged along the second fastener portion.

4. The apparatus for grasping and propping electronic devices as claimed in claim 1 comprising:

a padded sleeve; and, the hand strap being positioned through the padded sleeve.

5. The apparatus for grasping and propping electronic devices as claimed in claim 1 comprising:

the attachment mechanism comprising a magnet, a free setting, and a fixed setting;

the magnet being connected into the free setting;

the free setting being rotatably connected to the fixed setting; and, the fixed setting being connected onto the second lateral side.

6. The apparatus for grasping and propping electronic devices as claimed in claim 1 comprising:

a resting stub;

the first base end being terminally connected to the resting stub; and, the resting stub being oriented at an obtuse angle with the first lateral side.

7. The apparatus for grasping and propping electronic devices as claimed in claim 6 comprising:

a stub stopper grip; and, the stub stopper grip being terminally connected to the resting stub, opposite to the first base end.

8. The apparatus for grasping and propping electronic devices as claimed in claim 1 comprising:

a first ring;

a second ring;

the first ring being hingedly tethered to the hand strap, adjacent to the first base end; and, the second ring being hingedly tethered to the hand strap, adjacent to the second base end.

9. The apparatus for grasping and propping electronic devices as claimed in claim 1 comprising:

a palm-bracing protrusion;

the palm-bracing protrusion being positioned across the first lateral side; and, the palm-bracing protrusion being attached onto the first lateral side.

10. An apparatus for grasping and propping electronic devices comprising:

an oblong base;

a propping leg;

a hand strap;

an attachment mechanism;

a resting stub;

the oblong base comprising a first lateral side, a second lateral side, a first base end, and a second base end;

the hand strap comprising a first strap end and a second strap end;

the first lateral side being positioned opposite to the second lateral side about the oblong base;

the first strap end being hingedly connected to the oblong base, adjacent to the first base end;

the second strap end being hingedly connected to the oblong base, adjacent to the second base end;

the second base end being terminally connected to the propping leg;

the propping leg being oriented at an obtuse angle with the first lateral side;

the attachment mechanism being positioned in between the first base end and the second base end;

the attachment mechanism being mounted onto the second lateral side;

the first base end being terminally connected to the resting stub; and, the resting stub being oriented at an obtuse angle with the first lateral side.

11. The apparatus for grasping and propping electronic devices as claimed in claim 10 comprising:

a leg stopper grip; and, the leg stopper grip being terminally connected to the propping leg, opposite to the second base end.

12. The apparatus for grasping and propping electronic devices as claimed in claim 10 comprising:

a length-adjusting fastener;

the hand strap further comprising a first strap member and a second strap member;

the first strap member and the second strap member each comprising a first member end, a second member end, an inner band surface, and an outer band surface;

the length-adjusting fastener comprising a first fastener portion and a second fastener portion;

the first member end of the first strap member being hingedly connected to the oblong base, adjacent to the first base end;

the first member end of the second strap member being hingedly connected to the oblong base, adjacent to the second base end;

the second member end of the first strap member being positioned offset from the oblong base;

the second member end of the second strap member being positioned offset from the oblong base;

the first fastener portion being mounted onto the outer band surface of the first strap member, adjacent to the second member end of the first strap member;

the second fastener portion being mounted onto the inner band surface of the second strap member, adjacent to the second member end of the second strap member; and, the first fastener portion being engaged along the second fastener portion.

13. The apparatus for grasping and propping electronic devices as claimed in claim 10 comprising:

a padded sleeve; and, the hand strap being positioned through the padded sleeve.

14. The apparatus for grasping and propping electronic devices as claimed in claim 10 comprising:

the attachment mechanism comprising a magnet, a free setting, and a fixed setting;

the magnet being connected into the free setting;

the free setting being rotatably connected to the fixed setting; and, the fixed setting being connected onto the second lateral side.

15. The apparatus for grasping and propping electronic devices as claimed in claim 10 comprising:

a stub stopper grip; and, the stub stopper grip being terminally connected to the resting stub, opposite to the first base end.

16. The apparatus for grasping and propping electronic devices as claimed in claim 10 comprising:

a first ring;

a second ring;

the first ring being hingedly tethered to the hand strap, adjacent to the first base end; and, the second ring being hingedly tethered to the hand strap, adjacent to the second base end.

17. The apparatus for grasping and propping electronic devices as claimed in claim 10 comprising:

a palm-bracing protrusion;

the palm-bracing protrusion being positioned across the first lateral side; and, the palm-bracing protrusion being attached onto the first lateral side.

* * * * *